Nov. 8, 1960  R. A. STRACK ET AL  2,959,395
SEMI-TRAILER LANDING GEAR POWER ATTACHMENT
Filed July 23, 1958  2 Sheets-Sheet 2
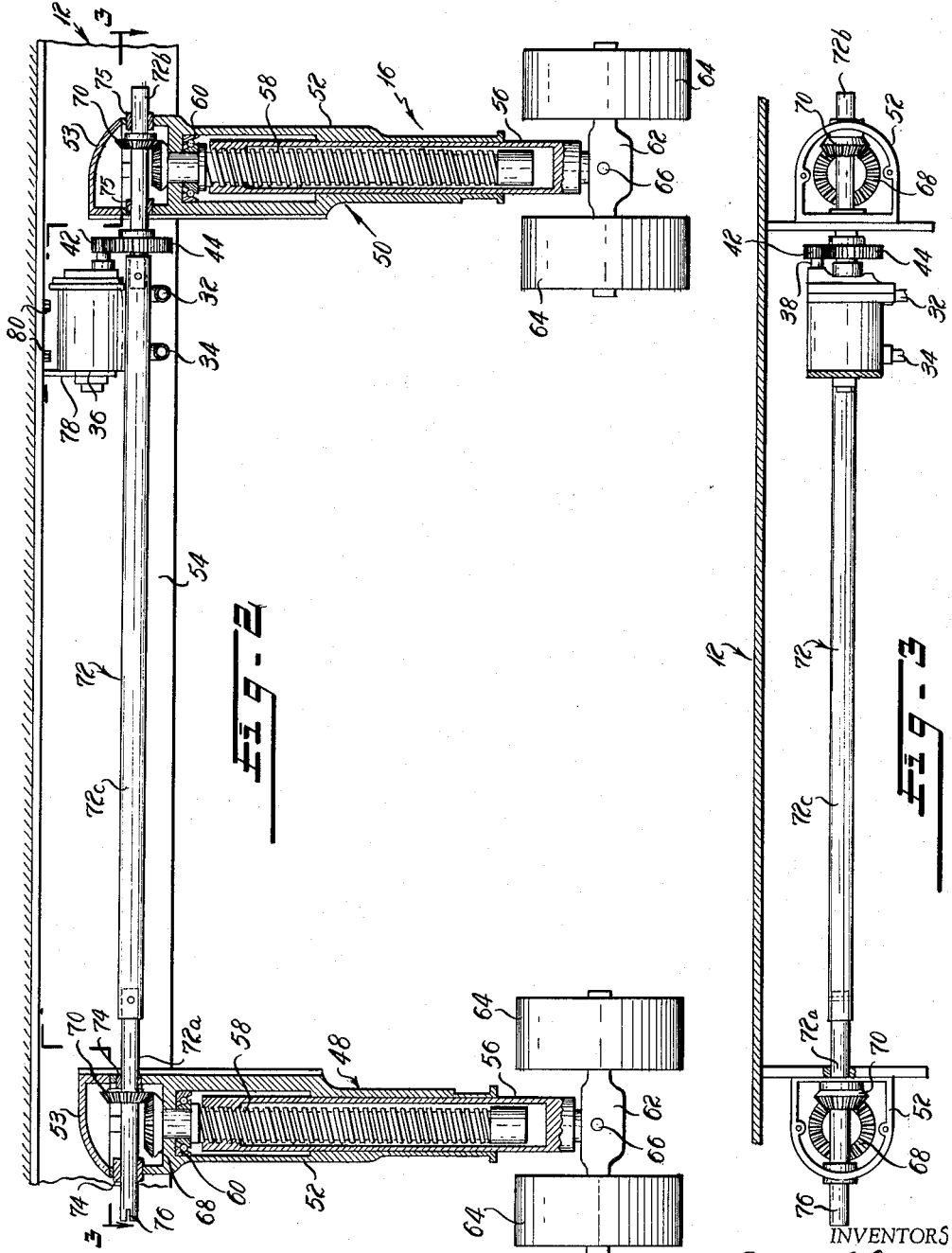
INVENTORS
ROBERT A. STRACK
CLARENCE L. FLOOD
BY Strauch, Nolan & Neale
ATTORNEYS

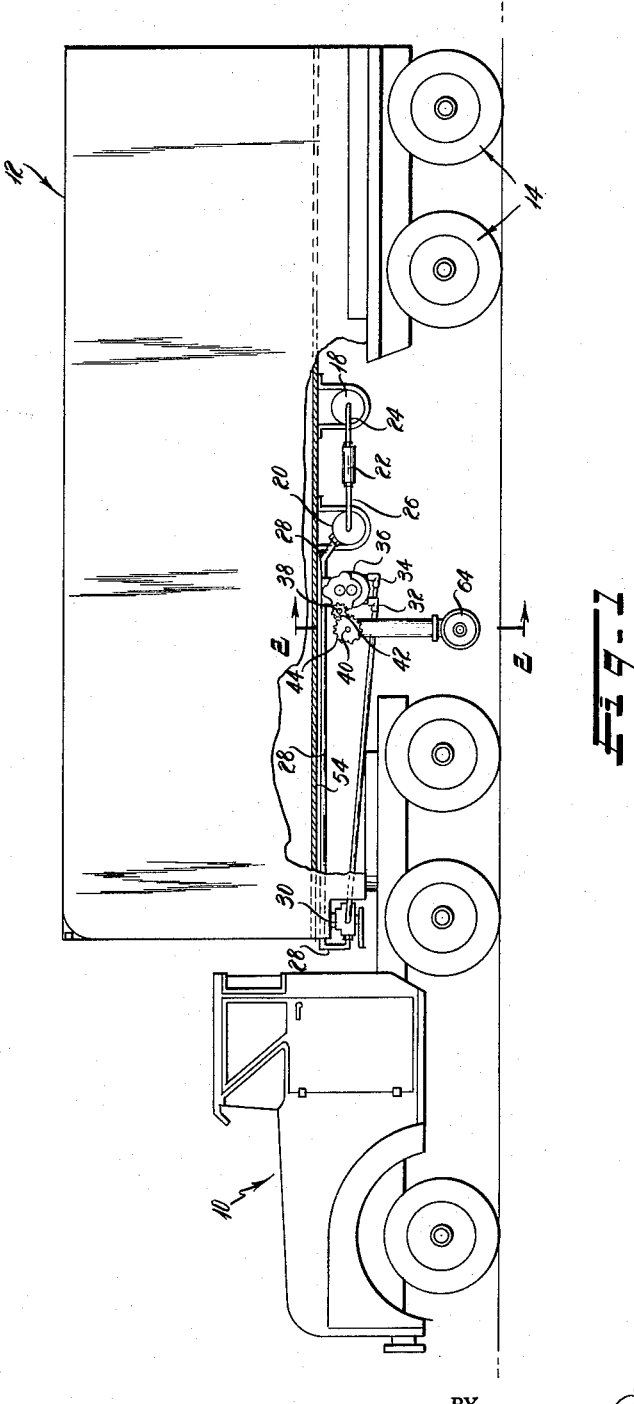

United States Patent Office 2,959,395
Patented Nov. 8, 1960

2,959,395

SEMI-TRAILER LANDING GEAR POWER ATTACHMENT

Robert A. Strack, 8 Breezewood Drive, and Clarence L. Flood, 40 N. Pleasant St., both of Norwalk, Ohio Filed July 23, 1958, Ser. No. 750,517

1 Claim. (Cl. 254—86)

The present invention relates to power attachments and more particularly to power attachment assemblies adapted for installation upon a semi-trailer road vehicle to operate the conventional manual crank actuated screw jack type landing gear assembly as presently provided to support the forward end of the semi-trailer when disassociated from its tractor tow unit.

Screw jack type landing gear assemblies have been adopted generally for semi-trailers because of their automatic self-locking characteristics which assure that the landing gear assembly will not collapse under the weight of the semi-trailer once it is uncoupled from the tractor. As generally constructed today, these landing gear assemblies have a drive shaft extending transversely of the vehicle and are adapted at one end at the side of the vehicle to receive a crank for manual crank actuation to raise or lower the wheels of the landing gear assemblies. In recent years, it has been recognized that it is important from the point of view of efficient utilization of both labor and the expensive tractor units, as well as from the point of view of more rapid and expeditious handling of freight, that manual actuation of semi-trailer landing gears is inefficient, time consuming and costly. For this reason, various efforts have been made in recent years to provide for rapid actuation of semi-trailer landing gear assemblies. Examples of such prior art efforts are found in United States Patent 2,817,493 issued December 24, 1957 to W. A. Belcher for Landing Gear for Semi-Trailers and United States Patent 2,523,962 issued September 26, 1950 to E. K. Mahaffey et al. for Electric Operating Device for Raising and Lowering Landing Gear for Semitrailers.

In certain instances, these prior art efforts have resulted in structures which necessitate a special type of landing gear and mount and are thus not compatible with the standard automatic self-locking screw jack type landing gear. In others, while useable with standard screw jack type semi-trailer landing gear, the attachments have involved heavy, expensive, complicated reversible gear mechanisms. Such attachments have also required relocation of the crank receiving power input shaft adaptor so that the crank, when used for manual actuation of the landing gear, must rotate about an axis extending longitudinally of the trailer, rather than transversely of the trailer, and is thus much more inconvenient to manipulate. For these reasons, the power drive attachments and adaptors for semi-trailer landing gears heretofore developed have not found wide acceptance.

The present invention contemplates the provision of an improved lightweight inexpensive power drive attachment for screw jack type semi-trailer landing gear assemblies which may be directly coupled to the existing crank powered drive shaft of the landing gear assembly without interfering with the normal crank adaptor end of the landing gear drive shaft so that, when necessary, the assembly may be manually actuated in the normal conventional convenient manner.

More specifically, it is an object of this invention to provide an improved power drive attachment for the power input shaft of a screw jack type semi-trailer landing gear assembly embodying a reversible motor adapted to be attached to the semi-trailer body frame adjacent the landing gear assembly drive shaft, a switching device interposed between the motor and an existing vehicle supported power source and having an off position adapted to selectively control the application of power to the motor for forward and reverse drives, and speed reducing gearing interposed between the power shaft of the reversible motor and the landing gear assembly drive shaft at a position remote from its crank adapted end.

A more specific object of the present invention is to provide an improved power drive attachment for the power input shaft of a screw jack type semi-trailer landing gear assembly embodying a reversible air motor adapted to be attached to the semi-trailer body adjacent the landing gear assembly drive shaft, an auxiliary compressed air storage tank adapted to be mounted beneath the semi-trailer body and for connection to the normal air brake air supply tank for reception of air therefrom through a one way valve, a three way valve switching device interposed between the motor and the auxiliary air tank and having an off position and forward and reverse positions in which it is effective to selectively control the introduction of air to the air motor to impart forward or reverse drive thereto, and speed reducing gearing interposed between the power shaft of the motor and the landing gear assembly drive shaft.

These and other objects of the present invention will become more fully apparent by reference to the appended claim and as the following detailed description proceeds in reference to the accompanying drawings wherein:

Figure 1 is a diagrammatic illustration of the application of the present invention to a semi-trailer;

Figure 2 is a transverse sectional view taken along the line 2—2 of Figure 1 and illustrating the semi-trailer landing gear construction and the mechanical interconnection of the power drive unit attachment thereto; and Figure 3 is a fragmentary sectional view taken substantially along the line 3—3 of Figure 2.

Referring now to Figure 1, the preferred embodiment of the present invention is illustrated as applied to a tractor trailer assembly comprising a tractor 10, and a semi-trailer 12 supported at its rear end on a conventional axle assembly 14. The semi-trailer 12 is equipped adjacent its forward end with a conventional screw jack type landing gear assembly 16 which, as illustrated in Figure 1, is in its raised non-supporting position. The semi-trailer 12 is conventionally equipped with a compressed air storage tank 18 to provide compressed air for actuation of air brakes associated with the outer ends of the axle assemblies 14.

The power attachment of the present invention in its preferred embodiment utilizes as a power source an auxiliary compressed air tank 20 connected in fluid communication with the air brake compressed air tank 18 through a check or one way valve 22 and pipes 24 and 26. Check valve 22 is arranged so that compressed air may flow from tank 18 to tank 20 but cannot flow in the reverse direction. Tank 20 is connected by a conduit 28 to the inlet of valve 30, preferably mounted on the frame of trailer 12 at the forward end for convenient manipulation by the operator from substantially the same position in which the trailer to tractor coupling is manipulated. Valve 30 is of the type having an inlet, and two distinct outlets and is selectively operable to one of three positions: (1) an "off" position, (2) a first "on" position in which the inlet is connected to one of the two outlets and (3) a second "on" position in which the inlet is connected to the other of the two outlets. Valves of this type are sometimes referred to as a "three way valve" and sometimes referred to as a "four way valve." Compressed air is transmitted from conduit 28 to conduits 32 and 34 alternatively under control of valve 30 when in a selected one of its two open positions. Conduits 32 and 34 are connected at their outlet ends to the forward and reverse inlet ports of an air motor 36. When air is supplied through one of the conduits 32 and 34, motor 36 is driven in one direction and when air is supplied through the other conduits 32 and 34, motor 36 is driven in the reverse direction. Motor 36 is exhausted to atmosphere. Air motor 36 may be of any conventional form having a rotating power output shaft such as 38. The output shaft 38 of motor 36 is drive connected to the power input shaft 40 of the landing gear assembly 16 through meshed spur gears 42 and 44.

The landing gear assembly, as illustrated most clearly in Figures 2 and 3, comprises a pair of telescopically arranged struts 48 and 50, each having a tubular housing 52 fixed to the rigid underframe 54 of the trailer body and an internal tubular member 56 axially, slidably non-rotatably received within the member 52 and threadedly connected at its upper end to a jack screw 58 which is supported in axially fixed relation relative to tubular member 52 by suitable thrust bearing 60. A transverse axle 62 journalling wheels 64 at its outer ends is pivoted at 66 upon the lower end of each of the members 56.

Jack screws 58 are interconnected through meshing bevel gears 68 and 70 to the common input drive shaft assembly 72 extending transversely of the semi-trailer body and comprising a pinion drive shaft 72a journalled at its opposite ends in the member 52 of strut 48 by bearings 74 and a horizontal jack shaft 72b journalled in bearings 75 on member 52, and an interconnecting concentric cross tube 72c. Gears 68 are fixed to the jack screws 58. Gears 70 are fixed to shafts 72a and b of shaft assembly 72. Shaft 72a is adapted at 76 to receive a crank (not shown) for manual rotation of the drive shaft assembly 72.

As is clearly illustrated in Figures 2 and 3, gear 44, meshing with the air motor output shaft gear pinion 42, is fixed adjacent the end of shaft 72b intermediate the struts 50 and the adjacent end of cross tube 72c. Motor 36 is mounted on a bracket 78 which is fixed to the undersurface of frame 54 by suitable bolts 80 with the pinion 42 on the output shaft 38 thereof in constant mesh with the gear 44 of the input drive shaft 72.

Rotation of the air motor output shaft 38 in one direction will rotate shaft assembly 72 and, through gears 70 and 68, rotate jack screws 58 to move the inner members 56 downwardly to lower the wheels 64 to engage the ground. Rotation of the air motor output shaft 38 in the opposite direction will, through the same drive train, rotate the screws 78 in the reverse direction to raise the inner members 56 and lift the wheels 64 from their ground engaging position.

From the foregoing detailed description, it is apparent that the present invention provides an easily installed economical power drive attachment for jack screw type semi-trailer landing gear assemblies. The entire unit consists preferably of standard commercial units. The auxiliary air tank 20 may be the conventional air tank as used in the air brake system. The check valve 22, the three way valve 30 and the air motor 36 all may be of any suitable standard commercial form. The bracket 78 is so located in frame 54 that the gears 42 and 44 may be of standard commercial sizes. The entire unit may be readily interconnected by suitable commercially available piping. The useability of standard commercial items greatly reduces the overall cost of the assembly. The unit may be readily and rapidly installed beneath the semi-trailer body by bolting of the motor mount bracket 78 to the underframing 54. Gear 44 is mounted in the position shown by loosening the set screws by which cross tube 72c is fixed to shafts 72a and b, sliding cross tube 72c to the left as viewed in Figure 2 to provide space to insert gear 44 between the ends of cross tube 72c and shaft 72b and sliding gear 44 on shaft 72b to the position shown. Gear 44 is then fixed to shaft 72b and cross tube 72c is recoupled between shafts 72a and b.

The power drive attachment in no way interferes with the normal application of a crank to the crank adapted end 76 of shaft 72 so that the landing gear assembly 16 may be manually actuated when desired or necessary in a normal manner.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

An alternate power attachment for an existing semi-trailer having a pair of crank actuated, screw jack type landing gear assemblies mounted in laterally opposed relation adjacent the forward end of said semi-trailer and operatively interconnected by an axially fixed transversely extending geared rigid drive shaft extending coaxially throughout its entire length and having an end conventionally adapted to receive an actuating crank, said power attachment comprising a drive gear fixed to said drive shaft, servomotor means having a power shaft; an output gear fixed to said power shaft; a mount for fixedly securing said servomotor means to the underside of said semi-trailer in juxtaposed axially fixed relationship to said crank shaft with said drive and output gears in constant meshed engagement; a source of air brake supply power on said semi-trailer, reversible control means adapted for connection to said source of power and selectively operable to energize said servomotor means to drive said power shaft, said output gear, said drive gear and said screw jack type landing gear assemblies selectively in opposite directions to project said landing gear assemblies into support position and to retract said landing gear assemblies into nonsupport position; said servomotor means including an air motor having an opposed pair of fluid inlet ports and said reversible control means including a 3-way reversing fluid valve having two pressure discharge ports corresponding respectively to oppositely acting operative positions; and conduit connections comprising a supply line connecting said reversing valve to said source of power and a pair of connections respectively interconnecting each of said reversing valve pressure discharge ports to a respective one of said pair of fluid inlet ports, said reversing valve being located at the forward end of said semi-trailer in a position accessible to an operator standing on the ground or on a tractor connected to said semi-trailer and including a manual control element adapting said reversing valve for instant operation.

References Cited in the file of this patent

UNITED STATES PATENTS

| | | |
|---|---|---|
| 1,552,011 | Schwerin | Sept. 1, 1925 |
| 2,048,264 | Harris | July 21, 1936 |
| 2,431,245 | Haig et al. | Nov. 18, 1947 |
| 2,817,493 | Belcher | Dec. 24, 1957 |
| 2,875,980 | Grace | Mar. 3, 1959 |

FOREIGN PATENTS

| | | |
|---|---|---|
| 1,095,463 | France | Dec. 22, 1954 |